Patented June 19, 1928.

1,674,401

UNITED STATES PATENT OFFICE.

LEON LILIENFELD, OF VIENNA, AUSTRIA.

CELLULOSE COMPOUND AND PROCESS FOR MAKING SAME.

No Drawing. Application filed July 23, 1924, Serial No. 727,805, and in Germany May 19, 1924.

According to the present invention, new cellulose derivatives may be obtained by causing compounds derived from ammonia in which an alcohol radical is substituted for at least one hydrogen atom of the ammonia, and in which at least one hydrogen atom of the ammonia can be replaced, to react with the products or reaction mixtures obtained by the action of a monohalogen derivative of a fatty acid on a cellulose-xanthic-acid or a cellulose-xanthate (viscose).

The new cellulose compounds are insoluble or only sparingly soluble in water, but are soluble in alkalies to give solutions which on addition of an agent that neutralizes the alkali (for example an organic or inorganic acid, an acid salt, an ammonium salt, or the like) or of a dehydrating agent (for example a salt, alcohol, or the like), yield precipitates or coagula which may be obtained in transparent, solid, flexible forms such as threads, films, or plates by bringing the solution into a suitable form. The new cellulose derivatives dissolve also, according to the nature of the alcohol radical intoduced into the amino-group, and according to the character of the cellulose component, in solutions of alkaline earths, in ammonia, in organic solvents or mixtures of solvents, such as bases (for example in many primary, secondary and tertiary amines of the aliphatic and aromatic series, in poly-amines, in quaternary bases of acyclic, cyclic and heterocyclic structure, in bodies of the guanidine and pyridine series, in phenols, in carbon disulphide, in mixtures of carbon disulphide with mono- or polyhalogen hydrocarbon derivatives, in halogen hydrins of polyhydroxylic alcohols, and the like). The presence of some water improves the solubility of the new cellulose compounds. Their solutions in suitable volatile solvents, e. g. aqueous pyridine, yield on drying transparent, flexible products (such as films, layers, threads or plates).

In the new cellulose compounds there are obtained for the first time substances of the cellulose group which can be worked up into technical products, by precipitation of their alkaline solutions, as well as by evaporation of their solutions in volatile solvents. These products are superior in many respects to those obtainable from the known cellulose derivatives which are soluble in alkali, for instance, in respect of their firmness in contact with water.

As already stated, the present invention concerns the reaction of cellulose-xantho-fatty acids or their salts or derivatives, with compounds derived from ammonia, containing an alcohol radical in place of at least one of the hydrogen atoms of the ammonia and in which at least one hydrogen atom of the ammonia can still be replaced. By the expression cellulose-xantho-fatty acid (cellulose-thionthiol-carbo-hydroxy paraffin monocarboxylic acid) in the description and claims are to be understood the products or reaction mixtures which may be obtained by acting on a cellulose-xanthic acid or a cellulose-xanthate (a thion-thiol-carbonic ester of cellulose, or a salt of such ester) with a monohalogen derivative of a fatty acid, or a salt or derivative thereof.

The cellulose-xanthic acid residue present in the cellulose-xantho-fatty acid may contain as the cellulose component cellulose itself, or a conversion product of cellulose, or any suitable cellulose compound.

As nitrogen compounds for the purpose of the invention there come into consideration compounds of the aliphatic and aromatic series in which at least one hydrogen atom of the ammonia is replaced by an aliphatic or aromatic alcohol residue, and in which there is still one hydrogen atom of the ammonia which can be replaced, in the first place the primary or secondary organic amines or hydro-amines (oxalkyl bases). The nitrogen compounds may be used in the free state, or in the form of their salts or derivatives.

The conditions may be varied within wide limits. On this account, the invention is not limited to the details of the following description of its practical utilization (illustrated by working examples) since these details do not affect the essence of the invention.

The cellulose-xantho-fatty acids are advantageously prepared by acting upon a cellulose-xanthic acid, namely an alkali compound of a thion-thiol-carbonic ester of cellulose without excess in alkali (for example, crude or purified form of viscose which has been neutralized or made acid by addition of a weak acid), or upon an alkali compound of a thion-thiol-carbonic ester of cellulose with alkali in excess (for instance, a crude or purified viscose of alkaline reaction), or upon a compound of cellulose-xanthic acid with another metal (for example, zinc)

with a monohalogen derivative of a fatty acid, or a salt or a derivative thereof (for example, according to the process described in specification No. 727,807). The cellulose-xanthic acid or cellulose-xanthate may be treated with the halogen-fatty acid either in dilute or concentrated solution, or as a paste, or in the form of the product of the reaction between alkali cellulose and carbon disulphide before bringing it into solution. The cellulose-xanthic acid or the cellulose-xanthate (viscose) may be converted into the cellulose-xantho-fatty acid either in the crude state or after purification by any known method.

It is to be understood that, where the context permits, the expressions "viscose", "cellulose-xanthic acid" and "cellulose-xanthate" used in the description and claims include the forms of cellulose-xanthic acid or cellulose-xanthate (viscose) named in the preceding paragraph.

The reaction between the cellulose-xanthic acid or cellulose xanthate, and the halogen derivative of the fatty acid on the one hand, and that between the cellulose-xantho-fatty acid and the organic nitrogen compound on the other hand, may be carried out in two separate operations, or may be combined into one operation. The organic nitrogen compound can therefore be caused to react with the isolated cellulose-xantho-fatty acid, or with the crude reaction mixture obtained in its preparation, or with the cellulose-xantho-fatty acid in the nascent state. That is to say, the nitrogen base may be brought into reaction either with the isolated cellulose-xantho-fatty acid or a salt thereof, or with the reaction mixture containing it, or with the cellulose-xanthic acid or cellulose-xanthate (viscose) before, during or after addition of the halogen-fatty acid or salt or derivative thereof.

The treatment of the cellulose-xantho-fatty acid, or salt thereof, with the organic nitrogen compound may be carried out in neutral, alkaline or acid solution, and the cellulose-xantho-fatty acid may be used for the reaction in the solid state or in suspension, for instance in alcohol.

In most cases, the reaction occurs at ordinary temperature; gentle or stronger heating usually accelerates it.

The amino-base may be added in excess, in the theoretical quantity, or in an amount which is less than the theoretical quantity.

The formation of the new cellulose compounds manifests itself by precipitation of the end product when the reaction is carried out in solution, and when the reaction mixture does not contain any substance which will dissolve the end-product or hinder its formation (for example a sufficient quantity of alkali). This precipitate forms a stiff or soft jelly if the solution of the cellulose-xanthic acid, or cellulose-xanthate, or cellulose-xantho-fatty acid is concentrated, and if the solution is not stirred, or is stirred only a little; if the solution is suitably diluted and stirred the product separates in the form of a fine or coarse precipitate.

The final product of the reaction may be isolated for example by separating the precipitate or the jelly from the mother liquor by filtering, straining through cloth, centrifuging or the like, and then washing it thoroughly with water. As a rule, the jelly contracts on standing for some time, and shows separation of liquid. The mother liquor and the washing water contain as chief by-product of the reaction the corresponding thio-hydroxy paraffin-mono-carboxylic acid. If the precipitate is a jelly, or is bulky, it is necessary to break it up before the washing process. In order to remove any by-products of the reaction which are insoluble or difficultly soluble in water, the washing with water may be followed by a washing with alcohol, or first with alcohol and then with ether, benzene or the like. The compound after washing may then either be dissolved in the wet condition (if necessary after previously removing the bulk of adhering wash-liquid by pressing, filtering, suction or centrifuging), or dried.

If no precipitate is formed, or if complete precipitation of the end product does not occur spontaneously, the product may be isolated, for example by treating the reaction mixture before or after completion of the reaction with an acid or an acid salt until a precipitate is produced, and then proceeding as already described.

According to their mode of formation and chemical behaviour, the new cellulose compounds produced according to the invention are thiourethanes (thio-carbamic acid esters or xanthamides) of cellulose or of the cellulose group, in which at least one hydrogen atom of the amido group is replaced by an alcohol radical. According to whether this alcohol radical is an alkyl, an aryl, or an aralkyl group, the new cellulose derivatives will be alkylthiourethanes (alkyl-thio carbamic acid esters, alkylxanthamides), or arylthiourethanes (aryl-thiocarbamic acid esters, aryl-xanthamides) or aralkyl-thiourethanes (aralkyl-thiocarbamic acid esters, aralkyl-xanthamides), of cellulose.

The simplest type of the new cellulose derivatives may be represented by the following formula (without however limiting the invention to this):—

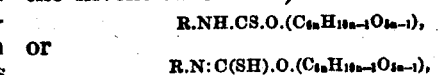

or

R.N:C(SH).O.(C₆H₁₀₋₁O₅₋₁), wherein R represents the alcohol radical which has been introduced into the amido group. This radical may be an alkyl or oxyalkyl group, an aryl- or oxyaryl group, or an aralkyl or oxyaralkyl group.

Where the context permits in the description and claims, the expression "alkyl" includes also oxyalkyl and hydroxyalkyl, "aryl" includes also oxyaryl and hydroxyaryl, and "aralkyl" includes also oxyaralkyl and hydroxyaralkyl.

The reactions leading to the formation of the new cellulose compounds may be represented for the simplest type by the following equations. As an example, are taken sodium cellulose xanthate, sodium chloracetate, and aniline:—

Formation of cellulose-xanth-acetic acid:—

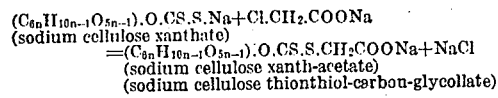
(sodium cellulose xanthate)
(sodium cellulose xanth-acetate)
(sodium cellulose thionthiol-carbon-glycollate)

Formation of cellulose-xanth-anilide:—

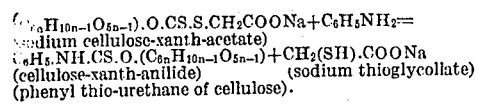
(sodium cellulose-xanth-acetate)
(cellulose-xanth-anilide) (sodium thioglycollate)
(phenyl thio-urethane of cellulose).

The invention is in no way limited to the equations given above, since these are given only for the purpose of illustration, and since an exhaustive and exact statement of the chemistry of the reaction is not a simple and readily solved problem in view of the imperfect knowledge of the constitution of cellulose.

The invention is illustrated by the following examples, the parts being by weight:—

1.

(a) 1000 parts of crude viscose (prepared for example by impregnating 100 parts of sulphite-cellulose in fleece- or sheet-form with 1000-2000 parts of caustic soda solution of 18 per cent strength at 15-18° C., allowing the mixture to stand at room temperature for 3-24 hours, pressing until the mass weighs 300-350 parts, comminuting in a shredder or the like, allowing to mature if necessary for 6-72 hours at room temperature, treating for several hours with 50-60 parts of carbon disulphide, and dissolving in sufficient water to bring the total weight of the solution to 1000 parts), corresponding with 100 parts of cellulose as parent material, are diluted, either in the freshly prepared condition, or after standing for a short or long period (6 hours to 3 days), with 5000 parts of water, and then treated, whilst stirring, with dilute acetic acid (e. g. 5-10 per cent strength) until the mixture shows a neutral or faintly alkaline reaction. As soon as the hydrogen sulphide liberated during the neutralization has escaped entirely or for the greater part, the viscose which has become light in colour is treated with a solution of sodium monochloracetate prepared by dissolving 60-100 parts of monochloracetic acid in 480-800 parts of water and neutralizing the solution with powdered sodium bicarbonate. When the solution of sodium monochloracetate has been incorporated with the viscose, the mixture is stirred for a short time and then allowed to stand at room temperature. After 6-48 hours standing, there are added to the mixture (which may be neutralized should it react faintly alkaline) whilst stirring, 60-120 parts of aniline. After several hours, the reaction product begins to separate in a finely divided state when the mixture is well stirred, and finally settles to the bottom. As soon as the precipitation is complete, or after the mixture has been allowed to stand after the precipitation for a period of from several hours to three days, the precipitate is separated from the mother-liquor by decanting, filtering, filtering under suction, straining through cloth or centrifuging; by acidifying mother liquor for instance with sulphuric acid, extracting it with ether and distilling the ether, a considerable quantity of thioglycollic acid can be detected (for example by the reaction toward ferric chloride and ammonia or by obtaining it in the pure state). The precipitate which has been separated from the mother liquor is thoroughly washed with water and dried at atmospheric or reduced pressure, if desired, after one or more treatments with alcohol, or with alcohol followed by ether.

The final product is a powdery substance, especially after grinding, insoluble or practically insoluble in water, alcohol or ether, but soluble in the following solvents, for example: dilute caustic alkali (for instance caustic soda of 1-10 per cent strength), aqueous ammonia (for instance 10-25 per cent), ethylamine, especially in presence of some water, diethylamine, especially in presence of some water, ethylene diamine, guanidine, especially in presence of some water, quaternary bases, aniline, piperidine, especially in presence of some water, pyridin, especially in presence of some water, α-monochlorhydrin, α-dichlorhydrin, especially in presence of some water, ethylenechlorhydrin, especially when mixed with water, phenol especially in presence of some water, and the like.

A suspension of the substance in water has a neutral reaction towards litmus.

When the substance is heated for 4-6 hours at 200° C. under pressure with sulphuric acid of 2 per cent strength, hydrogen sulphide and aniline are split off; the latter may be detected by all the known reactions for aniline in an ethereal extract of the reaction liquid when this has been made alkaline. On heating under pressure for several hours at 150-180° C. with ammonia of 25 per cent strength, the substance decomposes with liberation of hydrogen sulphide and aniline. On heating the substance for eight hours at 150–170° C. with hydrochloric acid of 1–2 per cent strength, hydrogen sulphide and aniline can be detected in the mixture, but no glycolic acid (on oxidation with nitric acid). At the same time, samples of a cellulose-xanth-acetic acid and of a cellulose glycolic acid when hated under the same conditions yield a considerable quantity of glycolic acid.

An elementary anaylsis gave the following results:—

| | Calculated for $C_{19}H_{25}NSO_{10}$ ($C_6H_5.NH.CS.O.(C_{12}H_{19}O_9)$) | Found |
|---|---|---|
| C | 49.67 | 47.81; 48.4 |
| H | 5.44 | 5.32; 5.13 |
| S | 6.97 | 7.15; 6.95 |
| N | 3.05 | 3.25; 3.06 |
| | Ash: 0.28% | |

Taking into account the fact that the substance analyzed was not specially purified, the above figures are in good agreement with those of a phenyl-thio-urethane of cellulose or of a body of the cellulose class (cellulose-xanth-anilide, phenyl-thiocarbamic acid ester of cellulose).

When a solution of the substance in dilute caustic soda (for example of 1–10 per cent strength) is spread on a glass plate and treated with a suitable precipitating bath (e. g. a solution of ammonium chloride of 20 per cent strength, dilute sulphuric acid, or aqueous acetic acid), there is obtained a skin, strong when wet, and transparent and shining when dry.

A solution of the cellulose-xanth-anilide in an aqueous solution of pyridine of 70–80 per cent strength yields on drying, a transparent, flexible film, having a notable resistance towards water. Its useful properties are not destroyed even by heating for several days at 60° C.

(b) The procedure is as in Example 1(a), with the variation that 150–250 parts of aniline are used. The large excess of aniline does not modify appreciably the properties and solubility of the product, but renders careful purification necessary, since in presence of a large quantity of aniline, tangible amounts of diphenyl-thiourea, and eventually also of diphenyl urea are sometimes formed as by-products. The cellulose-xanth-anilide may be freed from these aromatic ureas by thoroughly washing it with water, and extracting it with solvents for these substances, for instance alcohol, ether, or the like.

(c) The procedure is as in Example 1 (a), with the modification that only 30–40 parts of aniline are used. There is no appreciable alteration in the properties of solubility of the product.

(d) The procedure is as in Examples 1 (a), 1 (b) or 1 (c), with the modification that there are used only 30–40 parts of monochloracetic acid, dissolved in 320–400 parts of water.

The cellulose-xanth-anilide so obtained dissolves readily in dilute caustic soda, but does not dissolve in aqueous pyridine as readily as does the product of Example 1 (a).

(e) The procedure is as in Examples 1 (a), 1 (b), 1 (c) or 1 (d), with the exception that the aniline is added immediately or soon after (for example 10 minutes to 1 hour) the sodium monochloracetate has been incorporated in the viscose.

(f) The procedure is as in Examples 1 (a), 1 (b), 1 (c), 1 (d) or 1 (e), with the exception that 200–500 parts of monochloracetic acid dissolved in 1600—4000 parts of water and neutralized with powdered sodium bicarbonate are used.

(g) The procedure is as in Examples 1 (a), 1 (b), 1 (c), 1 (d), 1 (e) or 1 (f), with the exception that from the beginning the reaction mixture is kept at 8 to 12° C. until the addition of aniline takes place.

(h) The procedure is as in Examples 1 (a), 1 (b), 1 (c), 1 (d), 1 (e), 1 (f) or 1 (g), with the variation that the viscose is made faintly acid or distinctly acid by addition of dilute acetic acid. The properties of solubility of the product are not altered by this modification.

(i) The procedure is as in Examples 1 (a), 1 (b), 1 (c), 1 (d), 1 (e), 1 (f), 1 (g), or 1 (h), with the exception that the soda cellulose is reduced to 200 parts by pressing, and is sulphidized by means of 20–25 parts of carbon-disulphide.

2.

The procedure is as in any of the Examples 1 (a) to 1 (i) with the exception that instead of aniline there is used an equivalent amount of ortho-toluidine.

The cellulose-xantho-toluidides obtained correspond in their appearance, properties and solubilities with the anilides described in Example 1. The films obtained from solutions in caustic alkali or pyridine are very resistant towards water.

3.

Instead of the aniline used in any of the Examples 1 a) to 1 (i) there is used an equivalent amount of ethylamine or of methylamine. The reaction proceeds more quickly, and precipitation occurs in small jelly-like lumps, which may be broken up by stirring or kneading. The ethy- or methylthiourethane of cellulose, after washing and drying, dissolves in dilute caustic soda and in an aqueous solution of pyridine of 90 per cent strength. The solution in pyridine yields on drying a clear, flexible film.

4.

The procedure is as in any of the Examples 1 (a) to 1 (i), with the modification that instead of aniline there is added to the cellulose-xanth-acetic acid an equivalent amount of diethylamine. The reaction occurs remarkably quickly. The diethyl-thio-urethane of cellulose which separates in a finely divided state is insoluble or barely soluble in caustic soda solution of 1–10 per cent strength after washing and drying. It is readily soluble in aqueous pyridine of 90 per cent strength, giving a solution which yields on drying a lustrous transparent skin which is flexible and is resistant towards water.

5.

Instead of the aniline used in Example 1, there is used an equivalent amount of phenyl-ethylamine $(C_6H_5.CH_2.CH_2.NH_2)$.

The cellulose-phenyl-ethyl-thiourethane separates in flakes shortly after the addition, and, after washing and drying, is insoluble in caustic soda solution, but dissolves readily in an aqueous solution of pyridine of 90 per cent strength, to a solution which yields on drying a clear, lustrous, flexible film, which is very resistant towards water.

6.

The procedure only differs from that of the preceding examples in that the viscose is not neutralized before addition of the monochloracetic acid; the reaction mixture is neutralized or made faintly or distinctly acid, for example, with dilute acetic acid before the addition of the aniline or other amine.

Generally speaking the products so obtained exhibit the same properties and solubilities as do those prepared from viscose which has been neutralized, or made faintly or distinctly acid.

It is also possible to work by not neutralizing the viscose either before addition of the monochloracetic acid or before addition of the aniline or other amine; in the latter case the reaction with aniline occurs more slowly, and the final product is precipitated after a longer interval of time and in a less finely divided condition.

7.

(a) 1000 parts of viscose prepared according to the method described in Example 1, corresponding with 100 parts of cellulose as parent material, are diluted with 2000 parts of water, and treated with the solution prepared by dissolving 65–70 parts of monochloracetic acid in 260–280 parts of water and neutralizing the acid with solid sodium bicarbonate. After standing for 4–48 hours, the liquid mixture is neutralized with acetic acid of 10 per cent strength, 60–120 parts of aniline are added, and the mixture stirred. The product commences to separate after a few hours, and settles to the bottom; it may be separated from the mother-liquor either soon after the precipitation is complete, or after standing for 1–3 days, and may then be worked up as described in Example 1.

The cellulose-xanth-anilide forms a more or less fine powder after drying, and possesses properties and solubilities similar to those of the product described in Example 1 (a).

(b) The procedure is as in Example 7 (a), with the difference that there are used only 50–60 parts of monochloracetic acid dissolved in 200 parts of water and neutralized with solid sodium bicarbonate.

The cellulose-xanth-anilide so obtained is a powdery or flaky substance; it is soluble in dilute caustic soda, for example of 1–10 per cent strength, but is less soluble in aqueous pyridine of 70–80 per cent strength than is the product of Example 7 (a).

| | Calculated for $C_6H_5.NH.CS.O.(C_{24}H_{39}O_{19}) = C_{31}H_{45}NSO_{20}$ | Found |
|---|---|---|
| N | 1.78 | 1.72 |
| S | 4.07 | 4.08 |

Solutions of the substance in caustic soda yield on precipitation with an acid, transparent, lustrous, flexible films. Solutions of the substance in pyridine yield flexible skins on drying.

(c) The procedure is as in 7 (a) or 7 (b), but with the modification that there are added to the viscose only 30 parts of monochloracetic acid which have been dissolved in 120 parts of water and neutralized. The phenyl-thiourethane of cellulose so obtained dissolves readily in dilute caustic soda, but is less soluble in pyridine than is the product obtained in 7 (a) or 7 (b).

There may be used less aniline (for example 30–40 parts) or more aniline than is used in 7 (a), 7 (b) or 7 (c), without causing any appreciable variation in the product. In this example, also, the aniline may be added to the reaction mixture immediately or soon after the addition of the sodium monochloracetate.

8.

The procedure is as in Examples 7 (a), 7 (b) or 7 (c), with the difference that the viscose is neutralized with dilute acetic acid before the addition of the sodium chloracetate.

9.

1000 parts of viscose prepared as described in Example 1 are neutralized, without previously diluting, by means of a solution of acetic acid of 10 per cent strength, and there is then added, whilst stirring, the solution prepared by dissolving 80–90 parts of monochloracetic acid in 240–300 parts of water and neutralizing with powered sodium bicarbonate.

There are added whilst stirring, either directly afterwards, or after an interval of 10 minutes, 30–60 parts of aniline, whereupon the mixture is either stirred until precipitation begins or is completed, or it is allowed to stand. In the first case, the product separates as flakes or small pieces; in the second case, it solidifies to a gelatinous mass, which gradually contracts with separation of the mother-liquor. The precipitate (if a jelly it is first broken up or cut up), is washed and worked up as described in Example 1.

The cellulose-xanth-anilide dissolves readily to clear solutions in caustic soda solution of 2–10 per cent strength and in aqueous pyridine of 70 per cent strength.

In the foregoing examples, there may be used instead of monochloracetic acid an equivalent amount of a halogen derivative of a homologue of acetic acid, for instance α-bromopropionic acid, α-brombutyric acid, or bromosuccinic acid. The products so obtained resemble those obtained by using monochloracetic acid. The mother-liquor contains instead of thioglycolic acid the corresponding thiohydroxy paraffin-mono-carboxylic acid (for example thio lactic acid, thio-oxy-α-butyric acid or the thio-malic acid or the like).

Instead of using crude viscose, there may be used in the foregoing examples viscose which has been purified by any suitable method, for example by precipitating it with a saturated solution of common salt, and washing the precipitate with a salt solution of 10 per cent strength.

Furthermore, in the foregoing examples, instead of bleached or unbleached sulphite-cellulose there may be used as the parent material for preparing the cellulose-xanthic acid or cellulose-xanthate, any other bleached or unbleached cellulose (such as cotton or linters), or a material containing cellulose, or a conversion-product of cellulose (for example a hydratized or hydrolyzed cellulose or oxycellulose obtained for example by mercerization with strong lye, and washing if necessary; by grinding in presence of water; by the action of a strong mineral acid, zinc halide, or an ammoniacal solution of copper oxide; or by any other method), or a cellulose derivative which contains a free hydroxyl group to enable it to be converted into the thion-thiol-carbonic acid ester (for example an alkyl, oxyalkyl or hydroxyalkyl derivative of cellulose, a cellulose-hydroxy paraffin monocarboxylic acid, and the like).

In the description and claims, wherever the context permits, the expression "cellulose", alone or in combination with "xanthic acid", "xanthate", "xantho-fatty-acid", "xanthic acid ester", "thiocarbamic acid ester", or "thio-urethane", is used in each combination for shortness and includes cellulose itself and the conversion products and derivatives referred to in the preceding paragraph.

10.

100 parts of air-dried cellulose-xanthacetic acid prepared as in Example 1 of my co-pending application No. 727,807 are dissolved in 4000–5000 parts of an aqueous solution of aniline of 0.5 per cent strength, there are then added to the solution 50–100 parts of aniline, and the mixture is stirred. After a short while (about 20 minutes to one hour) the solution becomes thick and slimy, but shortly afterwards again becomes a thin liquid, whereupon it grows turbid and milky, and the separation of the cellulose-xanth-anilide soon begins.

After about 10–48 hours, the white precipitate has settled to the bottom, and may be separated from the mother-liquor and worked up as in the previous examples. An ethereal extract of the mother-liquor shows an intense reaction of thio-glycolic acid.

The properties, solubility, and elementary composition of the cellulose-xanth-anilide resemble those of the product obtained in Example 1 (a).

The expression "amine", "organic amine", "aliphatic amine", "aromatic amine", "aniline", and the like used in the description and claims, are intended to mean: all organic primary and secondary amines or hydramines, their salts and derivatives or compounds, as well as substances or mixtures of substances which give rise to such amines or to their salts or derivatives or compounds.

The expression "cellulose-xantho-fatty acid" means in the description and claims, the products or reaction mixtures obtained by treating a cellulose xanthic acid or a cellulose xanthate (for example any form of viscose which may be alkaline, neutral or acid), with a monohalogen derivative of a fatty acid, or with a salt or derivative thereof. This expression is intended also to include the salts of such cellulose-xantho-fatty acids, and also substances or mixtures of substances which give rise to such cellulose-xantho-fatty acids or to salts thereof.

The expressions "halogen derivative of a fatty acid", "monochloracetic acid" and the like, used in the description and claims mean the free acids themselves or salts or derivatives thereof.

The expression used in the claims "in the form of unshaped products is intended to mean: flakes, powder, sand, crumbs, bits, solutions, pastes, and the like.

The expression "cellulose thiourethane, in which at least one hydrogen atom of the amido group is replaced by an alcohol radical" means in the description and claims: an N-alkyl-, N-aryl-, or N-aralkyl-thiourethane of the cellulose group, in which the cellulose component is either cellulose itself or a conversion product or compound of cellulose; that is to say, as far as the present invention is concerned, the expression includes those products which may be obtained by acting with a compound derived from ammonia in which at least one hydrogen atom of the ammonia is replaced by an alcohol radical, on a cellulose-xantho-fatty acid, that is to say, on the products obtained by the reaction between viscose and a monohalogen-derivative of a fatty acid or a salt thereof.

I claim:

1. A process for the manufacture of new cellulose compounds, which comprises acting on a cellulose-xantho-fatty acid with a compound derived from ammonia in which at least one hydrogen atom of the ammonia is replaced by an organic radical, and at least one hydrogen atom of the ammonia can still be replaced.

2. A process for the manufacture of new cellulose compounds, which comprises acting on a cellulose-xantho-fatty acid with a compound derived from ammonia in which at least one hydrogen atom of the ammonia is replaced by an aryl group, and at least one hydrogen atom of the ammonia can still be replaced.

3. A process for the manufacture of new cellulose compounds, which comprises acting on a cellulose-xantho-fatty acid with an organic amine in which at least one hydrogen atom of the nitrogen-hydrogen group can be replaced.

4. A process for the manufacture of new cellulose compounds, which comprises acting on a cellulose-xantho-fatty acid with an aromatic amine in which at least one hydrogen atom of the nitrogen-hydrogen group can be replaced.

5. A process for the manufacture of new cellulose compounds, which comprises acting on a cellulose-xantho-fatty acid with aniline.

6. A process for the manufacture of new cellulose compounds, which comprises acting on a cellulose-xantho-fatty acid with an aniline.

7. A process for the manufacture of new cellulose compounds, which comprises acting on a cellulose-xanth-acetic acid with a compound derived from ammonia in which at least one hydrogen atom of the ammonia is replaced by an organic radical, and at least one hydrogen atom of the ammonia can be replaced.

8. A process for the manufacture of new cellulose compounds, which comprises acting on a cellulose-xanth-acetic acid with an organic amine in which at least one hydrogen atom of the nitrogen-hydrogen group can be replaced.

9. A process for the manufacture of new cellulose compounds, which comprises acting on a cellulose-xanth-acetic acid with an aromatic amine in which at least one hydrogen atom of the nitrogen-hydrogen group can be replaced.

10. A process for the manufacture of new cellulose compounds, which comprises acting on a cellulose-xanth-acetic acid with aniline.

11. A process for the manufacture of new cellulose compounds, which comprises acting on a cellulose-xanth-acetic acid with an aniline.

12. A process for the manufacture of new cellulose compounds, which comprises adding to viscose a monohalogen derivative of a fatty acid, and acting on the so obtained reaction mixture with a compound derived from ammonia in which at least one hydrogen atom of the ammonia is replaced by an organic radical and in which at least one hydrogen atom of the ammonia can be replaced.

13. A process for the manufacture of new cellulose compounds, which comprises adding to viscose a monohalogen derivative of a fatty acid, and acting on the so obtained reaction mixture with an organic amine in which at least one hydrogen atom of the nitrogen-hydrogen group can be replaced.

14. A process for the manufacture of new cellulose compounds, which comprises adding to viscose a monohalogen derivative of a fatty acid, and acting on the so obtained reaction mixture with an aromatic amine in which at least one hydrogen atom of the nitrogen-hydrogen group can be replaced.

15. A process for the manufacture of new cellulose compounds, which comprises adding to viscose a monohalogen derivative of a fatty acid, and acting on the so obtained reaction mixture with aniline.

16. A process for the manufacture of new cellulose compounds, which comprises adding to viscose a monohalogen derivative of a fatty acid, and acting on the so obtained reaction mixture with an aniline.

17. A process for the manufacture of new cellulose compounds, which comprises adding to viscose, monochloracetic acid, and acting on the so obtained reaction mixture with a compound derived from ammonia in which at least one hydrogen atom of the ammonia is replaced by an organic radical and in which at least one hydrogen atom of the ammonia can be replaced.

18. A process for the manufacture of new cellulose compounds, which comprises adding to viscose monochloracetic acid, and acting on the so obtained reaction mixture with an organic amine in which at least one hydrogen atom of the nitrogen-hydrogen group can be replaced.

19. A process for the manufacture of new cellulose compounds, which comprises adding to viscose monochloracetic acid, and acting on the so obtained reaction mixture with an aromatic amine in which at least one hydrogen atom of the amino-group can be replaced.

20. A process for the manufacture of new cellulose compounds, which comprises adding to viscose monochloracetic acid, and acting on the so obtained reaction mixture with aniline.

21. A process for the manufacture of new cellulose compounds, which comprises adding to viscose monochloracetic acid, and acting on the so obtained reaction mixture with an aniline.

22. A process for the manufacture of new cellulose compounds, which comprises treating viscose simultaneously with a monohalogen derivative of a fatty acid, and with an organic amine containing at least one hydrogen atom of the nitrogen-hydrogen group capable of being replaced.

23. A process for the manufacture of new cellulose compounds, which comprises treating viscose simultaneously with a monohalogen derivative of a fatty acid, and with an aromatic amine containing at least one hydrogen atom of the nitrogen-hydrogen group capable of being replaced.

24. A process for the manufacture of new cellulose compounds, which comprises treating viscose simultaneously with monochloracetic acid, and with an organic amine containing at least one hydrogen atom of the nitrogen-hydrogen group capable of being replaced.

25. A process for the manufacture of new cellulose compounds, which comprises treating viscose simultaneously with monochloracetic acid, and with an aromatic amine containing at least one hydrogen atom of the nitrogen-hydrogen group capable of being replaced.

26. A process for the manufacture of new cellulose compounds, which comprises acting on a cellulose-xantho-fatty acid with a compound derived from ammonia in which at least one hydrogen atom of the ammonia is replaced by an organic radical, and at least one hydrogen atom of the ammonia can still be replaced and isolating the product so obtained from the reaction mixture.

27. A process for the manufacture of new cellulose compounds, which comprises acting on a cellulose-xantho-fatty acid with an organic amine containing at least one hydrogen atom of the nitrogen-hydrogen group capable of being replaced, and isolating the product so obtained from the reaction mixture.

28. A process for the manufacture of new cellulose compounds, which comprises treating viscose with a monohalogen derivative of a fatty acid and with an organic amine containing at least one hydrogen atom of the nitrogen-hydrogen group which can be replaced, and isolating the product so obtained from the reaction mixture.

29. As a new product, a thio-urethane of the cellulose group, in the form of unshaped products, in which an organic radical has been substituted for at least one hydrogen atom of the amino-group.

30. As a new product, an aryl-thiourethane of the cellulose group in the form of unshaped products.

31. As a new product, a phenyl-thiourethane of the cellulose group in the form of unshaped products.

32. As a new product, a chemical compound of cellulose containing nitrogen and sulphur.

33. As a new product, a chemical compound of cellulose soluble in aqueous alkalies and containing nitrogen and sulphur.

34. A thiourethane of cellulose.

35. A substituted cellulose thiourethane.

36. A cellulose compound containing nitrogen and sulphur in which a carbon atom is attached to the cellulose group, a sulphur atom and a nitrogen atom by different linkages.

37. As a new product, a thio-urethane of the cellulose group in which an organic radical is attached to the nitrogen thereof.

In testimony whereof I affix my signature.

LEON LILIENFELD.